(12) United States Patent
Huang et al.

(10) Patent No.: US 10,198,657 B2
(45) Date of Patent: Feb. 5, 2019

(54) ALL-WEATHER THERMAL-IMAGE PEDESTRIAN DETECTION METHOD

(71) Applicant: NATIONAL CHUNG SHAN INSTITUTE OF SCIENCE AND TECHNOLOGY, Taoyuan (TW)

(72) Inventors: Shih-Shinh Huang, Kaohsiung (TW); Shih-Che Chien, Hsinchu (TW); Feng-Chia Chang, Kaohsiung (TW); Chien-Hao Hsiao, Hsinchu (TW); Yu-Sung Hsiao, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 65 days.

(21) Appl. No.: 15/375,438

(22) Filed: Dec. 12, 2016

(65) Prior Publication Data
US 2018/0165552 A1 Jun. 14, 2018

(51) Int. Cl.
| G06K 9/00 | (2006.01) |
| G06K 9/46 | (2006.01) |
| G06K 9/62 | (2006.01) |
| H04N 5/33 | (2006.01) |
| H04N 19/90 | (2014.01) |
| H04N 19/103 | (2014.01) |

(Continued)

(52) U.S. Cl.
CPC ....... *G06K 9/4642* (2013.01); *G06K 9/00369* (2013.01); *G06K 9/00791* (2013.01); *G06K 9/6269* (2013.01); *H04N 19/103* (2014.11); *H04N 19/136* (2014.11); *H04N 19/176* (2014.11); *H04N 19/90* (2014.11)

(58) Field of Classification Search
CPC .. G06K 9/6267; G06K 9/4642; G06K 9/6256; H04N 19/176
USPC .......................................................... 348/77
See application file for complete search history.

(56) References Cited

U.S. PATENT DOCUMENTS

| 2011/0249867 A1* | 10/2011 | Haas ................... G06K 9/00818 382/103 |
| 2012/0219211 A1* | 8/2012 | Ding .................... G06K 9/4642 382/159 |

(Continued)

*Primary Examiner* — Deirdre L Beasley
(74) *Attorney, Agent, or Firm* — Schmeiser, Olsen & Watts, LLP

(57) ABSTRACT

An all-weather thermal-image pedestrian detection method includes (a) capturing diurnal thermal images and nocturnal thermal images of a same pedestrian and non-pedestrian object in a same defined block to create a sample database of thermal images, wherein the sample database comprises pedestrian samples and non-pedestrian samples; (b) performing LBP encoding on the pedestrian samples and the non-pedestrian samples, wherein complementary LBP codes in the same defined block are treated as identical LBP codes; (c) expressing the LBP codes in the same defined block as features by a gradient direction histogram (HOG) to obtain feature training samples of the pedestrian samples and the non-pedestrian samples; (d) entering the feature training samples into a SVM to undergo training by Adaboost so as to form a strong classifier; and (e) effectuating pedestrian detection by searching the strong classifiers in thermal images with sliding window technique to detect for presence of pedestrians.

4 Claims, 3 Drawing Sheets

(a) — create a sample database of thermal images, wherein the sample database comprises a plurality of pedestrian samples and a plurality of non-pedestrian samples (b) — perform LBP encoding, in the same defined block, on the pedestrian samples and the non-pedestrian samples, wherein complementary LBP codes in the same defined block are treated as identical LBP codes;

(c) — express the LBP codes in the same defined block as features by a gradient direction histogram (HOG) to obtain feature training samples of the pedestrian samples and the non-pedestrian samples (d) — enter the feature training samples into a SVM to undergo training by Adaboost so as to form a strong classifier (e) — effectuate pedestrian detection by searching thermal images with sliding window technique to detect for presence of pedestrians.

(51) Int. Cl.
*H04N 19/136* (2014.01)
*H04N 19/176* (2014.01)

(56) References Cited

U.S. PATENT DOCUMENTS

| | | | |
|---|---|---|---|
| 2013/0058535 A1* | 3/2013 | Othmezouri | G06K 9/00369 382/103 |
| 2015/0161796 A1* | 6/2015 | Choi | H04N 5/33 348/77 |
| 2015/0310365 A1* | 10/2015 | Li | G06Q 10/0639 705/7.38 |
| 2016/0027046 A1* | 1/2016 | Huang | G06Q 30/0251 705/14.49 |
| 2016/0092736 A1* | 3/2016 | Mai | G06K 9/00624 382/103 |
| 2017/0098122 A1* | 4/2017 | el Kaliouby | A61B 5/744 |
| 2017/0268793 A1* | 9/2017 | Cardonha | G05B 13/021 |
| 2018/0063538 A1* | 3/2018 | Bernal | H04N 19/426 |
| 2018/0073877 A1* | 3/2018 | Lee | G01S 19/48 |
| 2018/0075300 A1* | 3/2018 | Mai | G06K 9/32 |
| 2018/0089497 A1* | 3/2018 | Romanenko | G06K 9/00221 |

* cited by examiner (a) create a sample database of thermal images, wherein the sample database comprises a plurality of pedestrian samples and a plurality of non-pedestrian samples (b) perform LBP encoding, in the same defined block, on the pedestrian samples and the non-pedestrian samples, wherein complementary LBP codes in the same defined block are treated as identical LBP codes;

(C) express the LBP codes in the same defined block as features by a gradient direction histogram (HOG) to obtain feature training samples of the pedestrian samples and the non-pedestrian samples (d) enter the feature training samples into a SVM to undergo training by Adaboost so as to form a strong classifier (e) effectuate pedestrian detection by searching thermal images with sliding window technique to detect for presence of pedestrians.

FIG.1

ALL-WEATHER THERMAL-IMAGE PEDESTRIAN DETECTION METHOD

FIELD OF THE INVENTION

The present invention relates to thermal-image pedestrian detection technology and, more particularly, to an all-weather thermal-image pedestrian detection method which works in all weathers and is based on block LBP encoding technology.

BACKGROUND OF THE INVENTION

Conventional thermal-image pedestrian detection technology is based on the premise that humanlike thermal images are high-brightness regions, and thus a thermal image is cut by thresholding to obtain several high-brightness possible pedestrian regions, so as to effectuate thermal-image pedestrian detection by humanlike samples or feature comparison. However, the efficiency of the aforesaid algorithm depends on the selection of a threshold. As a result, it does not apply to plenty surroundings, scenes, and weathers. To circumvent the aforesaid issue about the selection of a threshold, the thermal-image pedestrian detection technology nowadays entails describing humanlike profiles by texture features, defining a training database criterion, using plenty of humanlike and non-humanlike samples, training by machine learning a classifier capable of discerning effectively humanlike and non-humanlike samples, and scanning thermal images directly with the classifier, so as to circumvent erroneous cutting-related problems otherwise resulting from nowadays threshold selection.

Although the machine learning-based technology can circumvent cutting-related and cope with problems, such as difference in brightness between clothes in thermal images (cloth distortion) as well as difference in pedestrians' appearance (appearance variation), it fails to effectively overcome un-calibrated white-black polarity changes caused by thermal sensors. Un-calibrated white-black polarity arises from the brightness of humanlike regions in thermal images in contrast with ambient temperature. When the ambient temperature is low (for example, at dusk and at night), thermal image humanlike regions are high-brightness regions. Conversely, when the ambient temperature is high (for example, at noon and in the afternoon), thermal image humanlike regions are low-brightness regions. Hence, the prior art is effectively applicable to a specific situation but not in all weathers (including daytime and nighttime.)

SUMMARY OF THE INVENTION

In view of the aforesaid drawbacks of the prior art, the present invention provides a multi-level machine learning algorithm based on LBP index to thereby effectuate thermal-image pedestrian detection. The algorithm is carried out in two stages, namely training stage and testing stage. First, given a thermal image pedestrian database which comprises pedestrian samples and non-pedestrian samples, LBP is employed to perform texture encoding on thermal images located at all the defined rectangular blocks and attributed to all the samples, and then the training block thermal images are classified according to LBP codes. Afterward, training images of the same LBP code in the same rectangular block are expressed as features by a histogram of oriented gradient (HOG). A support vector machine (SVM) acquired by learning serves as pedestrian and non-pedestrian classifiers of the blocks and codes. Then, all the SVMs attributed to the same block are regarded as weak classifiers. A rectangular block (corresponding to a weak classifier) capable of recognition is selected by adaptive boosting (Adaboost) to thereby form a pedestrian classifier known as a strong classifier. Finally, subsequent pedestrian detection is performed. Second, in the testing stage, conventional sliding window technique is employed to convert a pedestrian detection question into a binary classification to detect for the presence of pedestrians in each sliding window by the learned pedestrian classifier, thereby effectuating pedestrian detection.

In order to achieve the above and other objectives, the present invention provides an all-weather thermal-image pedestrian detection method, comprising the steps of: (a) capturing diurnal thermal images and nocturnal thermal images of a same pedestrian and non-pedestrian object in a same defined block to create a sample database of thermal images, wherein the sample database comprises a plurality of pedestrian samples and a plurality of non-pedestrian samples; (b) performing LBP encoding, in the same defined block, on the pedestrian samples and the non-pedestrian samples in the sample database, wherein complementary LBP codes in the same defined block are treated as identical LBP codes; (c) expressing the LBP codes in the same defined block as features by a gradient direction histogram (HOG) to obtain feature training samples of the pedestrian samples and the non-pedestrian samples; (d) entering the feature training samples into a SVM to undergo training by Adaboost so as to form a strong classifier; and (e) effectuating pedestrian detection by searching the strong classifiers in thermal images with sliding window technique to detect for presence of pedestrians.

In an embodiment of the present invention, step (b) comprises the sub-steps of: (b1) performing LBP encoding on the diurnal thermal images and nocturnal thermal images of the pedestrian samples and the non-pedestrian samples; and (b2) treating complementary LBP codes in the same defined block as identical LBP codes.

In an embodiment of the present invention, step (c) comprises the sub-steps of: (c1) dividing the same defined block into a plurality of block regions; (c2) dividing each block region into a plurality of unit regions, wherein the unit regions each have a plurality of LBP codes; (c3) calculating gradient intensity and gradient direction of all the LBP codes in each block region; and (c4) performing vote counting on all the LBP codes in each unit region according to their gradient intensity and gradient direction to obtain the feature vector of each unit region, wherein the feature vectors of the unit regions together form HOG features of the block regions, respectively, and the HOG features of the block regions form the HOG features of the same defined block to therefore obtain features training samples of the pedestrian samples and the non-pedestrian samples.

In an embodiment of the present invention, step (d) comprises the sub-steps of: (d1) scanning a plurality of defined regions (of different sizes) on the whole image; (d2) allowing each defined block to obtain feature training samples of a plurality of pedestrian samples and non-pedestrian samples by steps (a)~(c); (d3) entering the feature training samples into the SVM to undergo training so as to obtain a plurality of weak classifiers; and (d4) searching, by Adaboost computation, the weak classifiers for at least a strong classifier with key positions of pedestrians.

In an embodiment of the present invention, step (e) comprises the sub-steps of: (e1) scanning the strong classifiers in the thermal images with sliding window technique; (e2) treating the blocks of the strong classifier as LBP codes;

and (e3) expressing the LBP codes as features by HOG; (e4) entering the HOG features into the SVM classifier to undergo pedestrian recognition.

Hence, the present invention provides an all-weather thermal-image pedestrian detection method based on block LBP encoding and multi-level humanlike classifiers to prevent, by LBP texture encoding and classification, poor recognition otherwise caused by feature confusion as a result of un-calibrated white-black polarity. Furthermore, the all-weather thermal-image pedestrian detection method entails selecting and integrating recognizable blocks by Adaboost training classifiers to preclude error recognition otherwise arising from hidden and varied postures and appearance of pedestrians.

BRIEF DESCRIPTION OF THE DRAWINGS

Objectives, features, and advantages of the present invention are hereunder illustrated with specific embodiments in conjunction with the accompanying drawings, in which:

FIG. 1 is a flow chart of an all-weather thermal-image pedestrian detection method according to an embodiment of the present invention;

DETAILED DESCRIPTION OF THE PREFERRED EMBODIMENTS

Referring to FIG. 1, an all-weather thermal-image pedestrian detection method of the present invention specifically comprises step (a)~step (e), wherein step (a)~step (d) are about a training stage, and step (e) is about a testing stage.

Step (a): capturing diurnal thermal images and nocturnal thermal images of the same pedestrian and non-pedestrian object in the same defined block and capturing the thermal images of pedestrians and non-pedestrian objects repeatedly to create a sample database of thermal images such that the sample database comprises diurnal and nocturnal thermal image samples of the pedestrians and the non-pedestrian objects.

Figure 2:
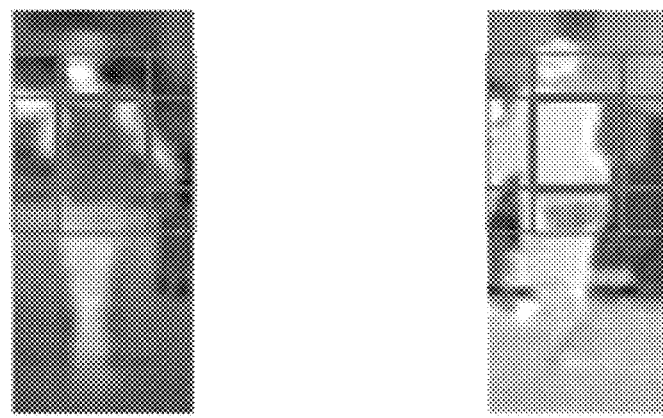
FIG. 2 are pictures illustrative of improved complementary features of LBP codes according to an embodiment of the present invention.

Step (b): performing LBP encoding on the pedestrians and non-pedestrian samples of the sample database in the same defined block, wherein complementary LBP codes in the same defined block are treated as identical LBP codes to preclude opposition between diurnal and nocturnal thermal images. Sub-step (b1) involves performing LBP encoding on the diurnal thermal images and nocturnal thermal images of the pedestrian samples and the non-pedestrian samples. Sub-step (b2) involves treating complementary LBP codes in the same defined block as identical LBP codes. Referring to FIG. 2, when it comes to a part of the body of a pedestrian, daytime LBP code $(01111100)_b=124$ and nighttime LBP code $(10000011)_b=131$ are complementary, and thus they are regarded as complementary features.

Step (c): expressing LBP codes in the same defined block as features by HOG to obtain feature training samples of the pedestrian samples and the non-pedestrian samples. Sub-step (c1) involves dividing the same defined block (window) into a plurality of block regions (blocks). Sub-step (c2) involves dividing each block region into a plurality of unit regions (cells), wherein the unit regions each have a plurality of LBP codes. Sub-step (c3) involves calculating gradient intensity and gradient direction of all the LBP codes in each block region. Sub-step (c4) involves performing vote counting on all the LBP codes in each unit region according to their gradient intensity and gradient direction to obtain the feature vector of each unit region, wherein the feature vectors of the unit regions together form HOG features of the block regions, respectively, and the HOG features of the block regions form the HOG features of the same defined block to therefore obtain features training samples of the pedestrian samples and the non-pedestrian samples. The HOG is mainly used in the form of weight HOG to serve as a feature descriptor for describing local humanlike image texture. At present, effective humanlike expression is verified, and HOG feature expression mainly includes the following three steps: (1) block definition; (2) calculation of gradient intensity and gradient direction; and (3) histogram-based counting. The three steps are described below.

Figure 3:
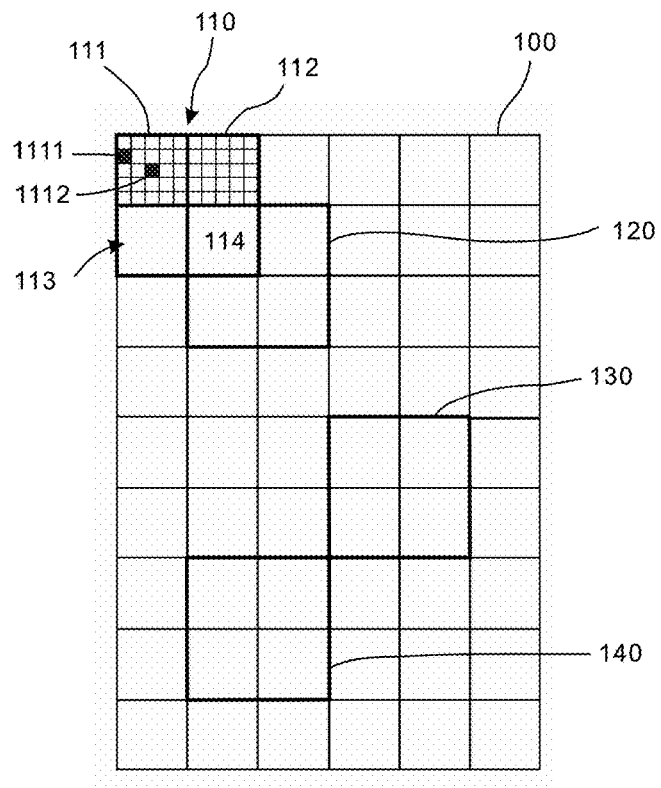
FIG. 3 is a schematic view of block definitions extracted from HOG features according to an embodiment of the present invention.

(1) Block definitions: the HOG algorithm divides an image screen into different window regions of different sizes and quantity. Referring to FIG. 3, there is shown a schematic view of window regions, block regions, unit regions, and pixels which result from the aforesaid division process performed with the HOG algorithm. Window regions 100 consist of block regions (such as block region 110~block region 140) of fixed size and quantity. The block regions consist of unit regions (such as unit region 111~unit region 114) of fixed size and quantity. The block regions may overlap (such as block region 110 and block region 120). The unit regions consist of pixels (such as pixel 1111 and pixel 1112) of fixed size and quantity. The unit regions do not overlap. Referring to FIG. 3, take block region 110 as an example, the block region 110 is divided into four unit regions 111~114, with a unit dimension of 4×4 pixels.

(2) calculation of gradient intensity and gradient direction: calculate horizontal component $d_h(x,y)=I(x+1,y)-I(x-1,y)$ and vertical component $d_v=I(x,y+1)-I(x,y-1)$ of all the pixel point (x,y) in the blocks through a horizontal mask $G_h=[-1,0,1]$ and a vertical mask $G_h=[-1,0,1]^T$, respectively, wherein I(x,y) expresses the brightness of pixel point (x,y). The gradient intensity m(x,y) and gradient direction θ(x,y) of (x,y) are calculated with Equation 1 and Equation 2 as follows:

$$m(x, y) = \sqrt{d_h(x, y)^2 + d_v(x, y)^2} \qquad \text{Equation 1}$$

$$\theta(x, y) = \tan^{-1}\left(\frac{d_v(x, y)}{d_h(x, y)}\right) \qquad \text{Equation 2}$$

(3) Histogram-based counting: Upon completion of the calculation process, vote counting is performed on the gradient direction of all the pixel points in each unit region according to gradient intensity. In general, the direction is divided to multiple Bins each equal 20'; hence, nine Bins together take up 180°. The Bin index corresponding to the pixel point (x,y) is $$\left\lfloor \frac{\theta(x, y)}{20} \right\rfloor.$$

The weight for use with vote counting is the gradient intensity of the pixel m(x,y). Therefore, a $9^{th}$ dimension feature vector $\{v_1, v_2, \ldots, v_9\}$ can be obtained from each cell. The nine-dimension feature vectors describe the texture characteristics of each unit region. Finally, feature vectors of four unit regions are coupled together by concatenation to form HOG feature vectors $\{v_1, v_2, \ldots, v_9, \ldots v_{36}\}$ of a 36 dimensions (9×4=36). Furthermore, according to the present invention, the pixel points expressed by the HOG feature vectors are replaced by LBP codes obtained in step (b). Accordingly, the present invention is effective in extracting features of thermal images by block LBP encoding.

Step (d): entering the feature training samples into the SVM to undergo training by Adaboost so as to form a strong classifier. Sub-step (d1) involves scanning a plurality of defined regions (of different sizes) on the whole image. Sub-step (d2) involves allowing each defined block to obtain feature training samples of a plurality of pedestrian samples and non-pedestrian samples by steps (a)~(c). Sub-step (d3) involves entering the feature training samples into the SVM to undergo training so as to obtain a plurality of weak classifiers. Sub-step (d4) involves searching, by Adaboost computation, the weak classifiers for at least a strong classifier with key positions of pedestrians.

Step (e): effectuating pedestrian detection by searching the strong classifiers in thermal images with sliding window technique to detect for the presence of pedestrians. Sub-step (e1) involves scanning the strong classifiers in the thermal images with sliding window technique. Sub-step (e2) involves treating the blocks of the strong classifier as LBP codes. Sub-step (e3) involves expressing the LBP codes as features by HOG. Sub-step (e4) involves entering the HOG features into the SVM classifier to undergo pedestrian recognition. Hence, the testing stage of the all-weather thermal-image pedestrian detection method of the present invention dispenses with the need to perform pedestrian recognition on each block region in a thermal image; instead, the all-weather thermal-image pedestrian detection method of the present invention only needs to scan, in step (d), the strong classifier (i.e., a pedestrian classifier) obtained by Adaboost training, and thus a system for use with the all-weather thermal-image pedestrian detection method requires relatively less calculation.

The LBP codes, SVM, and Adaboost classifier training are well-known image recognition techniques, and thus their operation steps are not described hereunder.

Figure 4:
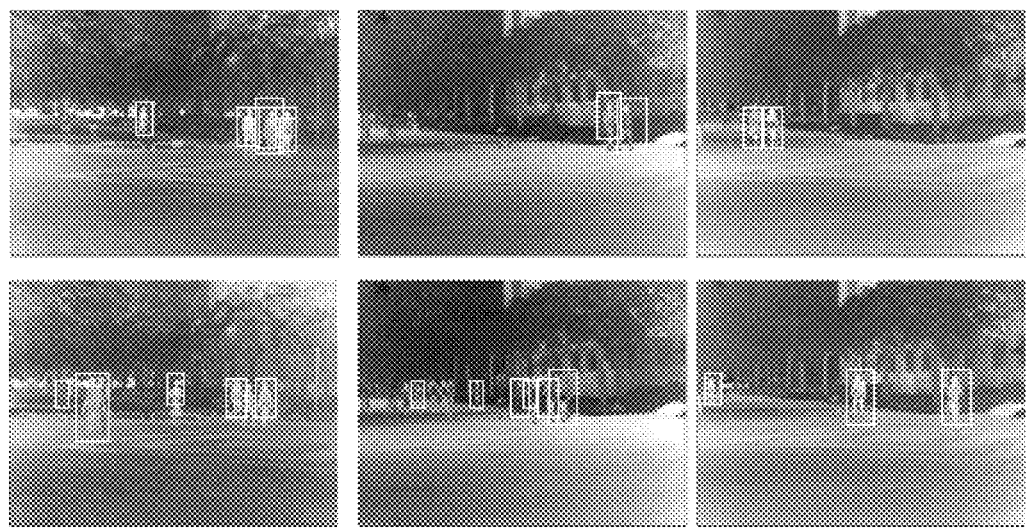
FIG. 4 are pictures illustrative of results of thermal-image pedestrian detection performed with the all-weather thermal-image pedestrian detection method according to an embodiment of the present invention.

The present invention further provides a self-constructed thermal image humanlike database which essentially contains images captured during four time periods (daytime, noon, dusk, and nighttime) in two days. Four experiments are conducted with the all-weather thermal-image pedestrian detection method. The four experiments are: experiment 1 (training: images captured during the four time periods on Day 1; testing: images captured during the four time periods on Day 2); experiment 2 (training: images captured during the four time periods on Day 2; testing: images captured during the four time periods on Day 1); experiment 3 (training: images captured in daytime and at noon in two days; testing: images captured at dusk and in nighttime in two days); and experiment 4 (training: images captured at dusk and in nighttime in two days; testing: images captured in daytime and at noon in two days). The experimental data thus obtained is shown in Table 1 below. According to the present invention, the criteria against which efficiency evaluation is carried out include precision, recall, and F-Measure. Table 1 shows that the all-weather thermal-image pedestrian detection method of the present invention has a precision of at least 98% and a recall rate of at least 80%. This indicates that the all-weather thermal-image pedestrian detection method of the present invention can be effectively applied to scenes in all weathers. Referring to FIG. 4, there are shown pictures illustrative of results of thermal-image pedestrian detection performed with the all-weather thermal-image pedestrian detection method according to an embodiment of the present invention. As revealed by the diagram, the all-weather thermal-image pedestrian detection method of the present invention can precisely detect thermal-image humanlike images.

TABLE 1 evaluation of efficiency of the all-weather thermal-image pedestrian detection method of the present invention

|  | experiment 1 | experiment 2 | experiment 3 | experiment 4 |
| --- | --- | --- | --- | --- |
| precision | 99.31% | 97.35% | 98.33% | 98.02% |
| recall | 92.98% | 82.40% | 82.40% | 65.47% |
| F-Measure | 96.04% | 89.67% | 89.67% | 78.50% |

Hence, the present invention provides an all-weather thermal-image pedestrian detection method based on block LBP encoding and multi-level humanlike classifiers to prevent, by LBP texture encoding and classification, poor recognition otherwise caused by feature confusion as a result of un-calibrated white-black polarity. Furthermore, the all-weather thermal-image pedestrian detection method entails selecting and integrating recognizable blocks by Adaboost training classifiers to preclude error recognition otherwise arising from hidden and varied postures and appearance of pedestrians.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An all-weather thermal-image pedestrian detection method, comprising the steps of:

(a) capturing diurnal thermal images and nocturnal thermal images of a same pedestrian and non-pedestrian object in a same defined block to create a sample database of thermal images, wherein the sample database comprises a plurality of pedestrian samples and a plurality of non-pedestrian samples;

(b) performing local binary patterns (LBP) encoding, in the same defined block, on the pedestrian samples and the non-pedestrian samples in the sample database, wherein complementary LBP codes in the same defined block are treated as identical LBP codes;

(c) expressing the LBP codes in the same defined block as features by a gradient direction histogram (HOG) to obtain feature training samples of the pedestrian samples and the non-pedestrian samples;

(d) entering the feature training samples into a support vector machine (SVM) to undergo training by adaptive boosting (Adaboost) so as to form a strong classifier, wherein step (d) comprises the steps of:

(d1) scanning a plurality of defined regions, of different sizes, on the whole image;

(d2) allowing each defined block to obtain feature training samples of a plurality of pedestrian samples and non-pedestrian samples by steps (a)~(c);

(d3) entering the feature training samples into the SVM to undergo training so as to obtain a plurality of weak classifiers; and (d4) searching, by Adaboost computation, the weak classifiers for at least a strong classifier with key positions of pedestrians; and (e) effectuating pedestrian detection by searching the strong classifiers in thermal images with sliding window technique to detect for presence of pedestrians.

2. The all-weather thermal-image pedestrian detection method of claim 1, wherein step (b) comprises the sub-steps of:

(b1) performing LBP encoding on diurnal thermal images and nocturnal thermal images of the pedestrian samples and the non-pedestrian samples; and (b2) treating complementary LBP codes in the same defined block as identical LBP codes.

3. The all-weather thermal-image pedestrian detection method of claim 1, wherein step (c) comprises the sub-steps of:

(c1) dividing the same defined block into a plurality of block regions;

(c2) dividing each block region into a plurality of unit regions, wherein the unit regions each have a plurality of LBP codes;

(c3) calculating gradient intensity and gradient direction of all the LBP codes in each block region; and (c4) performing vote counting on all the LBP codes in each unit region according to their gradient intensity and gradient direction to obtain the feature vector of each unit region, wherein the feature vectors of the unit regions together form HOG features of the block regions, respectively, and the HOG features of the block regions form the HOG features of the same defined block to therefore obtain features training samples of the pedestrian samples and the non-pedestrian samples.

4. The all-weather thermal-image pedestrian detection method of claim 1, wherein step (e) comprises the sub-steps of:

(e1) scanning the strong classifiers in the thermal images with sliding window technique;

(e2) treating the blocks of the strong classifier as LBP codes;

(e3) expressing the LBP codes as features by HOG; and (e4) entering the HOG features into the SVM classifier to undergo pedestrian recognition.

\* \* \* \* \*